US006594367B1

(12) United States Patent
Marash et al.

(10) Patent No.: US 6,594,367 B1
(45) Date of Patent: Jul. 15, 2003

(54) SUPER DIRECTIONAL BEAMFORMING DESIGN AND IMPLEMENTATION

(75) Inventors: Joseph Marash, Haifa (IL); Baruch Berdugo, Kiriat-Ata (IL)

(73) Assignee: Andrea Electronics Corporation, Melville, NY (US)

( * ) Notice: Subject to any disclaimer, the term of this patent is extended or adjusted under 35 U.S.C. 154(b) by 0 days.

(21) Appl. No.: 09/427,410

(22) Filed: Oct. 25, 1999

(51) Int. Cl.[7] .............................. H04R 3/00; G01S 3/80

(52) U.S. Cl. .......................................... 381/92; 367/119

(58) Field of Search ............................ 381/92; 367/119, 367/121

(56) References Cited

U.S. PATENT DOCUMENTS

| | | | |
|---|---|---|---|
| 2,379,514 | A | 7/1945 | Fisher |
| 2,972,018 | A | 2/1961 | Hawley et al. |
| 3,098,121 | A | 7/1963 | Wadsworth |
| 3,101,744 | A | 8/1963 | Warnaka |
| 3,170,046 | A | 2/1965 | Leale |
| 3,247,925 | A | 4/1966 | Warnaka |
| 3,262,521 | A | 7/1966 | Warnaka |
| 3,298,457 | A | 1/1967 | Warnaka |
| 3,330,376 | A | 7/1967 | Warnaka |
| 3,394,226 | A | 7/1968 | Andrews, Jr. |
| 3,416,782 | A | 12/1968 | Warnaka |
| 3,422,921 | A | 1/1969 | Warnaka |
| 3,562,089 | A | 2/1971 | Warnaka et al. |
| 3,702,644 | A | 11/1972 | Fowler et al. |
| 3,830,988 | A | 8/1974 | Mol et al. |
| 3,889,059 | A | 6/1975 | Thompson et al. |
| 3,890,474 | A | 6/1975 | Glicksberg |
| 4,068,092 | A | 1/1978 | Ikoma et al. |
| 4,122,303 | A | 10/1978 | Chaplin et al. |
| 4,153,815 | A | 5/1979 | Chaplin et al. |
| 4,169,257 | A | 9/1979 | Smith |
| 4,239,936 | A | 12/1980 | Sakoe |

(List continued on next page.)

FOREIGN PATENT DOCUMENTS

| | | |
|---|---|---|
| DE | 2640324 | 3/1978 |
| DE | 3719963 | 3/1988 |
| DE | 4008595 | 9/1991 |
| EP | 0 059 745 B1 | 9/1982 |
| EP | 0 380 290 A2 | 8/1990 |
| EP | 0 390 386 | 10/1990 |
| EP | 0 411 360 B1 | 2/1991 |
| EP | 0 509 742 A2 | 10/1992 |

(List continued on next page.)

OTHER PUBLICATIONS

Oppenheim Schafer, *Digital Signal Processing* (Prentice Hall) pp. 542–545.

P.P. Vaidyanathan, "Multirate Digital Filters, Filter Banks, Polyphase Networks, and Applications; A Tutorial," IEEE Proc., vol. 78, No. 1, Jan. 1990.

P.P. Vaidyanathan, "Quadrature Mirror Filter Banks, M–band Extensions and Perfect–Reconstruction Techniques," IEEE ASSP Magazine, Jul. 1987, pp. 4–20.

Rabiner et al., IEEE Trans. on Acous., vol. ASSP–24, No. 5, Oct. 1976, pp. 399–418.

(List continued on next page.)

*Primary Examiner*—Minsun Oh Harvey
*Assistant Examiner*—Laura A. Grier
(74) *Attorney, Agent, or Firm*—Frommer Lawrence & Haug, LLP; Thomas J. Kowalski

(57) ABSTRACT

A sensor array receiving system which incorporates one or more filters that are capable of adaptive and/or fixed operation. The filters are defined by a multiple of coefficients and the coefficients are set so as to maximize the signal to noise ratio of the receiving array's output. In one preferred embodiment, the filter coefficients are adaptively determined and are faded into a predetermined group of fixed values upon the occurrence of a specified event. Thereby, allowing the sensor array to operate in both the adaptive and fixed modes, and providing the array with the ability to employ the mode most favorable for a given operating environment. In another preferred embodiment, the filter coefficients are set to a fixed group of values which are determined to be optimal for a predefined noise environment.

44 Claims, 6 Drawing Sheets

U.S. PATENT DOCUMENTS

| | | | |
|---|---|---|---|
| 4,241,805 A | | 12/1980 | Chance, Jr. |
| 4,243,117 A | | 1/1981 | Warnaka |
| 4,261,708 A | | 4/1981 | Gallagher |
| 4,321,970 A | | 3/1982 | Thigpen |
| 4,334,740 A | | 6/1982 | Wray |
| 4,339,018 A | | 7/1982 | Warnaka |
| 4,363,007 A | | 12/1982 | Haramoto et al. |
| 4,409,435 A | | 10/1983 | Ono |
| 4,417,098 A | | 11/1983 | Chaplin et al. |
| 4,433,435 A | | 2/1984 | David |
| 4,442,546 A | | 4/1984 | Ishigaki |
| 4,453,600 A | | 6/1984 | Thigpen |
| 4,455,675 A | | 6/1984 | Bose et al. |
| 4,459,851 A | | 7/1984 | Crostack |
| 4,461,025 A | | 7/1984 | Franklin |
| 4,463,222 A | | 7/1984 | Poradowski |
| 4,473,906 A | | 9/1984 | Warnaka et al. |
| 4,477,505 A | | 10/1984 | Warnaka |
| 4,489,441 A | | 12/1984 | Chaplin et al. |
| 4,490,841 A | | 12/1984 | Chaplin et al. |
| 4,494,074 A | | 1/1985 | Bose |
| 4,495,643 A | | 1/1985 | Orban |
| 4,517,415 A | | 5/1985 | Laurence |
| 4,527,282 A | | 7/1985 | Chaplin et al. |
| 4,530,304 A | | 7/1985 | Gardos |
| 4,539,708 A | | 9/1985 | Norris |
| 4,559,642 A | | 12/1985 | Miyaji et al. |
| 4,562,589 A | | 12/1985 | Warnaka et al. |
| 4,566,118 A | | 1/1986 | Chaplin et al. |
| 4,570,155 A | | 2/1986 | Skarman et al. |
| 4,581,758 A | | 4/1986 | Coker et al. |
| 4,589,136 A | | 5/1986 | Poldy et al. |
| 4,589,137 A | | 5/1986 | Miller |
| 4,600,863 A | | 7/1986 | Chaplin et al. |
| 4,622,692 A | | 11/1986 | Cole |
| 4,628,529 A | | 12/1986 | Borth et al. |
| 4,630,302 A | | 12/1986 | Kryter |
| 4,630,304 A | | 12/1986 | Borth et al. |
| 4,636,586 A | | 1/1987 | Schiff |
| 4,649,505 A | | 3/1987 | Zinser, Jr. et al. |
| 4,653,102 A | | 3/1987 | Hansen |
| 4,653,606 A | | 3/1987 | Flanagan |
| 4,654,871 A | | 3/1987 | Chaplin et al. |
| 4,658,426 A | | 4/1987 | Chabries et al. |
| 4,672,674 A | | 6/1987 | Clough et al. |
| 4,683,010 A | | 7/1987 | Hartmann |
| 4,696,043 A | | 9/1987 | Iwahara et al. |
| 4,718,096 A | | 1/1988 | Meisel |
| 4,731,850 A | | 3/1988 | Levitt et al. |
| 4,736,432 A | | 4/1988 | Cantrell |
| 4,741,038 A | | 4/1988 | Elko et al. |
| 4,750,207 A | | 6/1988 | Gebert et al. |
| 4,752,961 A | | 6/1988 | Kahn |
| 4,769,847 A | | 9/1988 | Taguchi |
| 4,771,472 A | | 9/1988 | Williams, III et al. |
| 4,783,798 A | | 11/1988 | Leibholz et al. |
| 4,783,817 A | | 11/1988 | Hamada et al. |
| 4,783,818 A | | 11/1988 | Graupe et al. |
| 4,791,672 A | | 12/1988 | Nunley et al. |
| 4,802,227 A | | 1/1989 | Elko et al. |
| 4,811,404 A | | 3/1989 | Vilmur et al. |
| 4,833,719 A | | 5/1989 | Carme et al. |
| 4,837,832 A | | 6/1989 | Fanshel |
| 4,847,897 A | | 7/1989 | Means |
| 4,862,506 A | | 8/1989 | Landgarten et al. |
| 4,878,188 A | | 10/1989 | Ziegler et al. |
| 4,908,855 A | | 3/1990 | Ohga et al. |
| 4,910,718 A | | 3/1990 | Horn |
| 4,910,719 A | | 3/1990 | Thubert |
| 4,928,307 A | | 5/1990 | Lynn |
| 4,930,156 A | | 5/1990 | Norris |
| 4,932,063 A | | 6/1990 | Nakamura |
| 4,937,871 A | | 6/1990 | Hattori |
| 4,947,356 A | | 8/1990 | Elliott et al. |
| 4,951,954 A | | 8/1990 | MacNeill |
| 4,955,055 A | | 9/1990 | Fujisaki et al. |
| 4,956,867 A | | 9/1990 | Zarek et al. |
| 4,959,865 A | | 9/1990 | Stettiner et al. |
| 4,963,071 A | | 10/1990 | Larwin et al. |
| 4,965,834 A | | 10/1990 | Miller |
| 4,977,600 A | | 12/1990 | Ziegler |
| 4,985,925 A | | 1/1991 | Langberg et al. |
| 4,991,433 A | | 2/1991 | Warnaka et al. |
| 5,001,763 A | | 3/1991 | Moseley |
| 5,010,576 A | | 4/1991 | Hill |
| 5,018,202 A | | 5/1991 | Takahashi et al. |
| 5,023,002 A | | 6/1991 | Schweizer et al. |
| 5,029,218 A | | 7/1991 | Nagayasu |
| 5,046,103 A | | 9/1991 | Warnaka et al. |
| 5,052,510 A | | 10/1991 | Gossman |
| 5,070,527 A | | 12/1991 | Lynn |
| 5,075,694 A | | 12/1991 | Donnangelo et al. |
| 5,086,385 A | | 2/1992 | Launey et al. |
| 5,086,415 A | | 2/1992 | Takahashi et al. |
| 5,091,954 A | | 2/1992 | Sasaki et al. |
| 5,097,923 A | | 3/1992 | Ziegler et al. |
| 5,105,377 A | | 4/1992 | Ziegler, Jr. |
| 5,117,461 A | | 5/1992 | Moseley |
| 5,121,426 A | | 6/1992 | Bavmhauer |
| 5,125,032 A | | 6/1992 | Meister et al. |
| 5,126,681 A | | 6/1992 | Ziegler, Jr. et al. |
| 5,133,017 A | | 7/1992 | Cain et al. |
| 5,134,659 A | | 7/1992 | Moseley |
| 5,138,663 A | | 8/1992 | Moseley |
| 5,138,664 A | | 8/1992 | Kimura et al. |
| 5,142,585 A | | 8/1992 | Taylor |
| 5,192,918 A | | 3/1993 | Sugiyama |
| RE34,236 E | | 4/1993 | Taylor |
| 5,208,864 A | | 5/1993 | Kaneda |
| 5,209,326 A | | 5/1993 | Harper |
| 5,212,764 A | | 5/1993 | Ariyoshi |
| 5,219,037 A | | 6/1993 | Smith et al. |
| 5,226,077 A | | 7/1993 | Lynn et al. |
| 5,226,087 A | | 7/1993 | Ono |
| 5,241,692 A | | 8/1993 | Harrison et al. |
| 5,251,263 A | | 10/1993 | Andrea et al. |
| 5,251,863 A | | 10/1993 | Gossman et al. |
| 5,260,997 A | | 11/1993 | Gattey et al. |
| 5,272,286 A | | 12/1993 | Cain et al. |
| 5,276,740 A | | 1/1994 | Inanaga et al. |
| D344,730 S | | 3/1994 | Gattey et al. |
| 5,311,446 A | | 5/1994 | Ross et al. |
| 5,311,453 A | | 5/1994 | Denenberg et al. |
| 5,313,555 A | | 5/1994 | Kamiya |
| 5,313,945 A | | 5/1994 | Friedlander |
| 5,315,661 A | | 5/1994 | Gossman et al. |
| 5,319,736 A | | 6/1994 | Hunt |
| 5,327,506 A | | 7/1994 | Stites, III |
| 5,332,203 A | | 7/1994 | Gossman et al. |
| 5,335,011 A | | 8/1994 | Addeo et al. |
| 5,348,124 A | | 9/1994 | Harper |
| 5,353,347 A | | 10/1994 | Irissou et al. |
| 5,353,376 A | | 10/1994 | Oh et al. |
| 5,361,303 A | | 11/1994 | Eatwell |
| 5,365,594 A | | 11/1994 | Ross et al. |
| 5,375,174 A | | 12/1994 | Denenberg |
| 5,381,473 A | | 1/1995 | Andrea et al. |
| 5,381,481 A | | 1/1995 | Gammie et al. |
| 5,384,843 A | | 1/1995 | Masuda et al. |
| 5,402,497 A | | 3/1995 | Nishimoto et al. |
| 5,402,669 A | * | 4/1995 | Pla et al. ...................... 381/58 |

| | | | |
|---|---|---|---|
| 5,412,735 A | | 5/1995 | Engebretson et al. |
| 5,414,769 A | | 5/1995 | Gattey et al. |
| 5,414,775 A | | 5/1995 | Scribner et al. |
| 5,416,845 A | | 5/1995 | Qun |
| 5,416,847 A | | 5/1995 | Boze |
| 5,416,887 A | | 5/1995 | Shimada |
| 5,418,857 A | | 5/1995 | Eatwell |
| 5,423,523 A | | 6/1995 | Gossman et al. |
| 5,431,008 A | | 7/1995 | Ross et al. |
| 5,432,859 A | | 7/1995 | Yang et al. |
| 5,434,925 A | | 7/1995 | Nadim |
| 5,440,642 A | | 8/1995 | Denenberg et al. |
| 5,448,637 A | | 9/1995 | Yamaguchi et al. |
| 5,452,361 A | | 9/1995 | Jones |
| 5,457,749 A | | 10/1995 | Cain et al. |
| 5,469,087 A | | 11/1995 | Eatwell |
| 5,471,106 A | | 11/1995 | Curtis et al. |
| 5,471,538 A | | 11/1995 | Sasaki et al. |
| 5,473,214 A | | 12/1995 | Hildebrand |
| 5,473,701 A | | 12/1995 | Cezanee et al. |
| 5,473,702 A | | 12/1995 | Yoshida et al. |
| 5,475,761 A | | 12/1995 | Eatwell |
| 5,481,615 A | | 1/1996 | Eatwell et al. |
| 5,485,515 A | | 1/1996 | Allen et al. |
| 5,493,615 A | | 2/1996 | Burke et al. |
| 5,502,869 A | | 4/1996 | Smith et al. |
| 5,511,127 A | | 4/1996 | Warnaka |
| 5,511,128 A | | 4/1996 | Lindeman |
| 5,515,378 A | | 5/1996 | Roy, III et al. |
| 5,524,056 A | | 6/1996 | Killion et al. |
| 5,524,057 A | | 6/1996 | Akiho et al. |
| 5,526,432 A | | 6/1996 | Denenberg |
| 5,546,090 A | | 8/1996 | Roy, III et al. |
| 5,546,467 A | | 8/1996 | Denenberg |
| 5,550,334 A | | 8/1996 | Langley |
| 5,553,153 A | | 9/1996 | Eatwell |
| 5,563,817 A | | 10/1996 | Ziegler, Jr. et al. |
| 5,568,557 A | | 10/1996 | Ross et al. |
| 5,581,620 A | | 12/1996 | Brandstein et al. |
| 5,592,181 A | | 1/1997 | Cai et al. |
| 5,592,490 A | | 1/1997 | Barratt et al. |
| 5,600,106 A | | 2/1997 | Langley |
| 5,604,813 A | | 2/1997 | Evans et al. |
| 5,615,175 A | | 3/1997 | Cater et al. |
| 5,617,479 A | | 4/1997 | Hildebrand et al. |
| 5,619,020 A | | 4/1997 | Jones et al. |
| 5,621,656 A | | 4/1997 | Langley |
| 5,625,697 A | | 4/1997 | Bowen et al. |
| 5,625,880 A | | 4/1997 | Goldburg et al. |
| 5,627,746 A | | 5/1997 | Ziegler, Jr. et al. |
| 5,627,799 A | | 5/1997 | Hoshuyama |
| 5,638,022 A | | 6/1997 | Eatwell |
| 5,638,454 A | | 6/1997 | Jones et al. |
| 5,638,456 A | | 6/1997 | Conley et al. |
| 5,642,353 A | | 6/1997 | Roy, III et al. |
| 5,644,641 A | | 7/1997 | Ikeda |
| 5,649,018 A | | 7/1997 | Gifford et al. |
| 5,652,770 A | | 7/1997 | Eatwell |
| 5,652,799 A | | 7/1997 | Ross et al. |
| 5,657,393 A | | 8/1997 | Crow |
| 5,664,021 A | | 9/1997 | Chu et al. |
| 5,668,747 A | | 9/1997 | Obashi |
| 5,673,325 A | | 9/1997 | Andrea et al. |
| 5,676,353 A | | 10/1997 | Jones et al. |
| 5,689,572 A | | 11/1997 | Ohki et al. |
| 5,692,053 A | | 11/1997 | Fuller et al. |
| 5,692,054 A | | 11/1997 | Parrella et al. |
| 5,699,436 A | | 12/1997 | Claybaugh et al. |
| 5,701,344 A | | 12/1997 | Wakui |
| 5,715,319 A | | 2/1998 | Chu |
| 5,715,321 A | | 2/1998 | Andrea et al. |
| 5,719,945 A | | 2/1998 | Fuller et al. |
| 5,724,270 A | | 3/1998 | Posch |
| 5,727,073 A | | 3/1998 | Ikeda |
| 5,732,143 A | | 3/1998 | Andrea et al. |
| 5,745,581 A | | 4/1998 | Eatwell et al. |
| 5,748,749 A | | 5/1998 | Miller et al. |
| 5,768,473 A | | 6/1998 | Eatwell et al. |
| 5,774,859 A | | 6/1998 | Houser et al. |
| 5,798,983 A | | 8/1998 | Kuhn et al. |
| 5,812,682 A | | 9/1998 | Ross et al. |
| 5,815,582 A | | 9/1998 | Claybaugh et al. |
| 5,825,897 A | | 10/1998 | Andrea et al. |
| 5,825,898 A | * | 10/1998 | Marash ........................ 381/92 |
| 5,828,768 A | | 10/1998 | Eatwell et al. .............. 381/110 |
| 5,835,608 A | | 11/1998 | Warnaka et al. ........... 381/94.7 |
| 5,838,805 A | | 11/1998 | Warnaka et al. ............ 381/190 |
| 5,874,918 A | | 2/1999 | Czarnecki et al. .......... 342/417 |
| 5,909,460 A | | 6/1999 | Dent .......................... 375/130 |
| 5,909,495 A | | 6/1999 | Andrea ........................ 381/67 |
| 5,914,912 A | | 6/1999 | Yang .......................... 367/119 |
| 6,084,973 A | * | 7/2000 | Green et al. .................. 381/92 |
| 6,178,248 B1 | * | 1/2001 | Marash ........................ 381/92 |

FOREIGN PATENT DOCUMENTS

| | | |
|---|---|---|
| EP | 0 483 845 | 1/1993 |
| EP | 0 583 900 A1 | 2/1994 |
| EP | 0 595 457 A1 | 5/1994 |
| EP | 0 721 251 | 7/1996 |
| EP | 0 724 415 | 11/1996 |
| FR | 2305909 | 10/1976 |
| GB | 1 160 431 | 8/1969 |
| GB | 1 289 993 | 9/1972 |
| GB | 1 378 294 | 12/1974 |
| GB | 2 172 769 A | 9/1986 |
| GB | 2 239 971 B | 7/1991 |
| GB | 2 289 593 A | 11/1995 |
| JP | 56-89194 | 7/1981 |
| JP | 59-64994 | 4/1984 |
| JP | 62-189898 | 8/1987 |
| JP | 1-149695 | 6/1989 |
| JP | 1-314098 | 12/1989 |
| JP | 2-070152 | 3/1990 |
| JP | 3-169199 | 7/1991 |
| JP | 3-231599 | 10/1991 |
| JP | 4-16900 | 1/1992 |
| WO | WO 88/09512 | 12/1988 |
| WO | WO 92/05538 | 4/1992 |
| WO | WO 92/17019 | 10/1992 |
| WO | WO 94/16517 | 7/1994 |
| WO | WO 95/08906 | 3/1995 |
| WO | WO 96/15541 | 5/1996 |
| WO | WO 97/23068 | 6/1997 |

OTHER PUBLICATIONS

Rubiner et al., *Digital Processing of Speech Signals* (Prentice Hall, 1978) pp. 130–135.

Sapontis, *Probability, Lambda Variables and Structural Processes*, pp. 467–474.

Scott C. Douglas, "A Family of Normalized LMS Algorithms," IEEE Signal Proc. Letters, vol. 1, No. 3, Mar. 1994.

Sewald et al., "Application of . . . Beamforming to Reject Turbulence Noise in Airducts," IEEE ICASSP vol. 5, No. CONF–21, May 7, 1996, pp. 2734–2737.

White, *Moving–Coil Earphone Design*, 1963, pp. 188–194.

Widrow et al., "Adaptive Noise Canceling: Principles and Applications," Proc. IEEE, vol. 63, No. 12, Dec. 1975, pp. 1692–1716.

Youla et al., IEEE Trans. on Acous., vol. MI–1, No. 2, Oct. 1982, pp. 81–101.

B.D. Van Veen and K.M. Buckley, "Beamforming: A Versatile Approach to Spatial Filtering," IEEE ASSN Magazine, vol. 5, No. 2, Apr. 1988, pp. 4–24.

Beranek, *Acoustics* (American Institute of Physics, 1986) pp. 116–135.

Boll, IEEE Trans. on Acous., vol. ASSP–27, No. 2, Apr. 1979, pp. 113–120.

Daniel Sweeney, "Sound Conditioning Through DSP", The Equipment Authority, 1994.

Edward J. Foster, "Switched on Silence", Popular Science, 1994, p. 33.

John M. Cioffi, "Limited–Precision Effects in Adaptive Filtering," IEEE Trans. on Circuits, vol. CAS–34, No. 7, Jul. 1987.

Kuo, *Automatic Control of Systems*, pp. 504–585.

L.J. Griffiths and C.W. Jim, "An Alternative Approach to Linearly Constrained Adaptive Beamforming," IEEE Trans. on Antennas, vol. AP–30, No. 1, Jan. 1982, pp. 27–34.

Luenberger, *Optimization by Vector Space Method*, pp. 134–138.

Monzingo and Miller, *Introduction to Adaptive Arrays*, (Wiley, NY) pp. 89–105; 155–216.

O.L. Frost III, "An Algorithm for Linearly Constrained Adpative Array Processing,"0 Proc. IEEE, vol. 60, No. 8, pp. 926–935, Aug. 1972.

Ogata, *Modern Contol Engineering*, pp. 474–508.

* cited by examiner

SUPER DIRECTIONAL BEAMFORMING DESIGN AND IMPLEMENTATION

CROSS-REFERENCE TO RELATED APPLICATIONS

This application is related to application U.S. Ser. No.: 09/425,790, by Andrea et al., filed on Oct. 22, 1999 and entitled "System and Method for Adaptive Interference Canceling," hereby incorporated by reference.

FIELD OF THE INVENTION

This invention relates to signal processing, and more particularly, to processing the signals received by an array of sensors in order to minimize the amount of noise received by the array when the array is being used to receive a desired signal.

BACKGROUND OF THE INVENTION

Beamforming is a term used to designate the operations associated with forming spatial sensitivity pattern for an array of sensors. Classical beamforming is defined as "delay and sum beamforming". In delay and sum beamforming, a source transmits a wave that propagates and arrives at an array of sensors at different times, depending on the source direction and the array geometry. The outputs of the sensors of the array are delayed, to compensate for the delay in time of arrival of the source's wave, which originated from the preferred direction, and summed, to provide a classical directional beamformer output. The effect of sources that are located at directions other than the preferred direction (referred to as the looking direction) is reduced by the beamforming process, resulting in maximum sensitivity of the process towards the preferred direction.

The array of sensors can be, for example, an array of microphones receiving an acoustic sound source. The beamforming process can be used to map sound sources (in a sonar system for example), or to emphasize a sound source whose direction is known, by modifying the compensating delays and "steering" the look direction of the array. The beam-width—usually defined as the difference between the two angles, in which the output energy is reduced by 3 dB relative to the beam center—depends on the array length, frequency of the received signal and propagation speed of the received signal (in our example the speed of sound). For many practical purposes the beam-width of the array will not be sufficiently narrow, and enlarging the array length is not desired. For those cases a more directional beamforming process is required.

Moreover, while delay and sum beamforming, does not provide optimum noise reduction. If the sensors' outputs are filtered (a different filter to each sensor) and the outputs of the filters summed, one can obtain a different shape of the beamformer output and improve noise reduction. With a careful design it is possible, for example, to create a null (zero reception) towards a given direction. If a noise source's direction is known and a null is placed in that direction, improved noise reduction can be realized as compared to the noise reduction of the classic delay and sum beamformer.

Two basic approaches have been developed to obtain optimum performance of a beamformer in the presence of noise. The first one, presented in Monzingo and Miller—Introduction to Adaptive Arrays (Wiley, N.Y.) pp. 89–105 and 155–216 shows that if a filter is created for each sensor that for each frequency will have gain weights of $$w_{opt} = \frac{C^{-1}v}{vC^{-1}v} \tag{1}$$

the output of the beamformer will have optimum performance in terms of noise reduction. The above weights will maintain a unity gain at the look direction (no distortion of the desired signal) while providing minimum energy at the output. The two assumptions (minimum energy and no signal degradation) will result minimum noise at the output. In Eq. (1) C is the noise covariance matrix and it may be expressed as:

$$C=E\{y^*y^T\} \tag{2}$$ where $$y^T=[y_1(f)y_2(f) \ldots y_n(f)] \tag{3}$$

is the noise measurement at the elements, and v is the steering vector towards the look direction, expressed as:

$$v = \begin{bmatrix} e^{-jw\tau 0} \\ e^{-jw\tau 1} \\ e^{-jw\tau(n-1)} \end{bmatrix} \text{ where} \tag{4}$$

$\tau 0-\tau(n-1)$ are the steering delays introduced to elements 0–n respectively by a target originated at the look direction. Further, the filtered elements approach was extended by Frost (O. L. Frost, III, "An Algorithm for Linearly Constrained Adaptive Array Processing," *Proc. IEEE, vol.* 60, no. 8, pp. 926–935, August 1972.) to provide an adaptive beamformer in which the weights would adapt themselves so that they converge to provide the optimum solution.

The second basic approach to obtain optimum beamformer performance was developed by Griffiths (L. J. Griffiths and C. W. Jim, "An Alternative Approach to Linearly Constrained Adaptive Beamforming," *IEEE Trans. Antennas Propagat.*, vol. AP-30, no. 1, pp. 27–34, January 1982.) who suggested using a Noise Canceling (NC) approach to the optimum beamformer problem. In his approach the adaptive coefficient are updated by the Least Mean Squares (LMS) algorithm. Griffiths proposed using the elements' signals to obtain a main channel, in which both the signal and the noise are present, and reference channels, in which only noise is present (i.e. which are signal free). The main channel can be generated through one of the elements alone, or through classic delay and sum beamforming. The reference channels can be generated through the subtraction of one element from another, or by forming any other linear combination of elements that would provide a zero output at the look direction (i.e. the signal direction). The main channel and the reference channels are utilized by an adaptive LMS Widrow filter to obtain an optimum beamformer (see Adaptive Noise Canceling: Principals and Applications—Widrow, Glover, McCool—*Proc. IEEE* vol. 63 no. 12 1692–1716, December 1975). In this adaptive beamformer each reference channel is filtered (i.e. each channel signal is convolved with a set of filter coefficients), the filtered channels are summed together to obtain the noise estimation, and the noise estimation is subtracted from the main channel to provide a noise free signal. The filter coefficients in the Griffiths solution converge to $$w_{opt}=C^{-1}p \tag{5}$$ where C is the noise covariance matrix and p is the correlation vector between the beam output and the reference channels.

Note that with this approach the steering is done through the creation of the reference channels and the beam, so there is no steering vector towards the look direction in equation (5). Griffiths showed that, for an n elements system, if one creates n−1 reference channels, the LMS approach would converge to the same optimum solution as Frost.

Objects and Summary of the Invention

It has been recognized that while the two approaches to optimum beamforming discussed above were primarily developed to provide an adaptive solution, they also teach us what the optimum solution would be given the noise covariance matrix. A non-adaptive approach, in which predetermined filters are designed and used, is sometimes more appealing than an adaptive approach. The fixed beam (non-adaptive) approach is much less computationally intensive, it is much less sensitive to leakage of the desired signal to the reference channels and it does not give rise to distortion in the desired signal. Also, the fixed approach has the potential to handle some types of noises better than an adaptive process, such as reverberation and diffused low noises. On the other hand, one may not want to give up the adaptive process, because it provides the best immunity to significant directional noises. A hybrid system that uses both adaptive and non-adaptive techniques provides a system which realizes the advantages of both techniques.

Further, it has been recognized that while the above described optimum beamforming techniques provide the solution given the noise covariance matrix, they do not show how to determine this matrix for a particular noise scenario. Also, the equations show how the required weights for each frequency can be computed, but they do not show how to implement the time domain filters that will approximate the weighting solution. The prior work in this area does not discuss how such time domain filters would be designed or implemented in a combined adaptive/non-adaptive beamforming system. Moreover, there is no teaching as to techniques for overcoming differences in the elements' sensitivity, phase, or the influence of packaging and other mechanical interferences on the performance of the fixed beam.

In view of the above considerations, it is an object of the invention to provide a sensor array beamforming system capable of optimal noise reduction performance.

It is another object of the invention to provide a simple and easy method to design optimal filters in a sensor array beamforming system.

It is still another object the invention to provide a simple and easy way to implement the optimal system in as a fixed solution system or as a combined fixed and adaptive system.

It is yet another object of the invention to provide a method to design optimum filters for a sensor array beamforming system that would take into consideration the specific characteristics of the sensors (microphones for example), and other mechanical or acoustical features that influence the performance of the array.

In order to realize the above objects of the invention and overcome the drawbacks of prior systems, the invention provides a sensor array receiving system which incorporates one or more filters that are capable of adaptive and/or fixed operation. The filters are defined by a multiple of coefficients and the coefficients are set so as to maximize the signal to noise ratio of the receiving array's output. In one preferred embodiment, the filter coefficients are adaptively determined and are faded into a predetermined group of fixed values upon the occurrence of a specified event. Thereby, allowing the sensor array to operate in both the adaptive and fixed modes, and providing the array with the ability to employ the mode most favorable for a given operating environment. In another preferred embodiment, the filter coefficients are set to a fixed group of values which are determined to be optimal for a predefined noise environment.

Thus, reference is made to application U.S. Ser. No.: 09/425,790, by Andrea et al., filed on Oct. 22, 1999 and entitled "System and Method for Adaptive Interference Canceling," which, together with the documents and patents and patent applications cited therein are hereby incorporated by reference; the present invention may be used in conjunction with embodiments disclosed or discussed in Andrea et al. and/or in the documents, patents and patent applications cited in Andrea et al. (and incorporated herein), e.g., the "Superbeam" technology of this invention can be used in conjunction with "DSDA" technology in embodiments disclosed or discussed in Andrea et al. and/or in the documents, patents and patent applications cited in Andrea et al. (and incorporated herein).

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION

The following description will be divided into four parts. Part one will detail a method for designing and implementing fixed beam optimal filters based on the filtered input approach. Part two will detail a method for designing and implementing fixed beam optimal filters based on the filtered references approach. Part three will detail a hybrid system that includes both a fixed solution and an adaptive one. Part four will detail two alternative approaches to the design and implementation of fixed beam filters.

1—A method of Designing and Implementing Fixed Beam Optimal Filters Based on the Filtered Input Approach.

Figure 1:
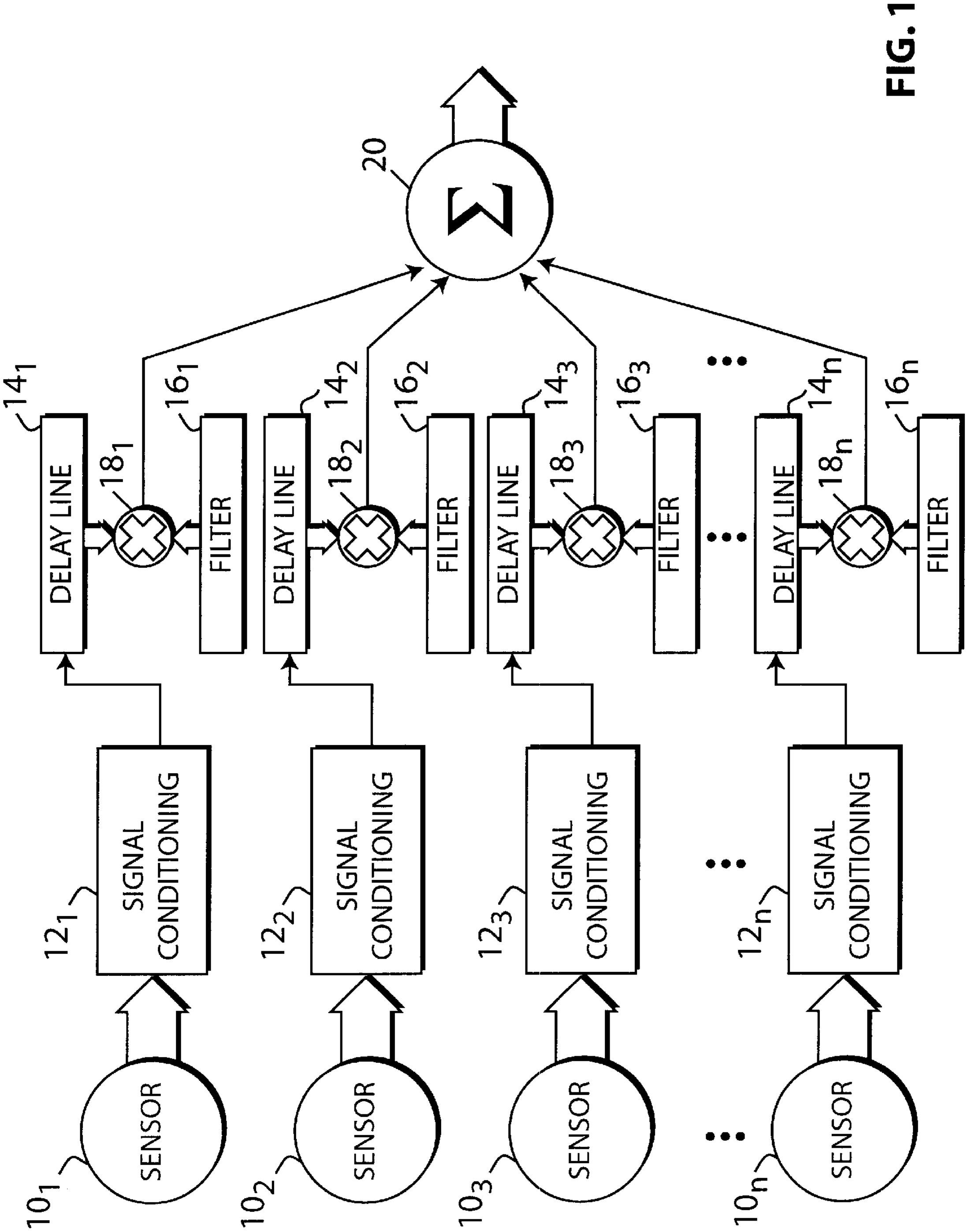
FIG. 1 is block diagram of a filtered input type beamforming system in accordance with the present invention.

FIG. 1 is block diagram of a filtered input type beamforming system in accordance with the present invention. As can be seen from the FIG. 1, N microphones $\mathbf{10}_{1-N}$ are conditioned and sampled by signal conditioners $\mathbf{12}_{1-N}$. The microphones' samples are respectively stored in time tapped delay lines $\mathbf{14}_{1-N}$ and filtered by filters $\mathbf{16}_{1-N}$ via convolvers $\mathbf{18}_{1-N}$. The output of the filters is summed up via an adder 20 to provide a fixed beamformer solution. In the FIG. 1 embodiment, the invention provides a method for creating the noise covariance matrix and then using equation (1) to actually design the coefficients for filters $\mathbf{16}_{1=N}$. It should be noted that the equation provides us with the required coefficients in the frequency domain. The time domain coefficients are obtained from the frequency domain coefficients.

To determine the optimal solution for any given scenario we first define the scenario in terms of the spatial distribution of the interfering sources (directions and relative intensity). For each of the interfering sources we assume a far field model. Let us consider an array of M identical omni-directional sensors with a known arbitrary geometry measuring the wave-field generated by a single far-field source. Let $r_i$ denote the location of the i-th sensor, where $r_i=[x_i, y_i, z_i]$ and let φ and θ denote the azimuth and elevation angles of the radiating source, respectively.

Let us now define a differential delay vector, which expresses the delay in time of arrival of the interference wave front to the various elements:

$$\vec{\tau} = [\tau_{12}, \tau_{13}, \cdots, \tau_{1,M}]^T; \qquad \tau_{1j} \equiv \tau_j - \tau_1,$$

where the first sensor serves as a reference and the delays are measured relative to it. The signal "Direction Of Arrival" vector for the far field case is given by:

$$k = \begin{bmatrix} k_x \\ k_y \\ k_z \end{bmatrix} = \begin{bmatrix} \sin(\theta)\cos(\phi) \\ \sin(\theta)\sin(\phi) \\ \cos(\theta) \end{bmatrix}. \tag{6}$$

Let us define a distance matrix R between the sensors of the array $$R \equiv \begin{bmatrix} 0 \\ r_2 - r_1 \\ \vdots \\ r_M - r_1 \end{bmatrix} \tag{7}$$

The time delay between any two sensors is equal to the projection of the distance vector between them along the k vector divided by the wave propagation velocity (sound velocity for example). Consequently, the delay vector can be expressed as follows:

$$\tau = -\frac{Rk}{c} \tag{8}$$

where c is the wave velocity and the matrix R is composed of the distance vectors between all the sensors and the reference sensor. More explicitly, for sensor j we can write $$\tau_{1j}=[x_{1j}\cos(\theta)\sin(\phi)+y_{1j}\sin(\theta)\sin(\phi)+z_{1j}\cos(\phi)]/c \tag{9}$$

Assuming that interference i has an amplitude of $s_i$ and a Direction Of Arrival vector of $k_i$ then its measurement by the array can be expressed as the source steering vector multiplied by the source amplitude $$y_i(f)=s_i b_i(f)=s_i e^{-j\omega\bar{\tau}}=s_i e^{-j2\pi fRk/c} \tag{10}$$

The contribution of source i to the noise covariance matrix is expresses as:

$$C_i E\{y_i y_i^1\} \tag{11}$$

Since $b_i$ is deterministic and we assume stationary sources where $s_i^2$ the power of the source i the above equation is reduced to $$C_i=y_i y_i^1 \tag{11a}$$

Under the assumption that the interferences are uncorrelated we can write $$C=\Sigma C_i \tag{12}$$

If we assume that there is an additive uncorrelated noise (spatially distributed white noise) n to each of the sensors we obtain $$C=nI+\Sigma C_i \tag{13}$$ where I is the unity matrix with a size of [M×M].

So far we obtained the noise covariance matrix for a predetermined noise environment. In order to use equation (1) we need to calculate the steering vector v. This steering vector expresses the look of the array towards a defined direction. The steering vector v is the conjugate of the vector already expressed in equation (4) and it is calculated in the same way as the steering vector of the noise sources (see (8) and (9)) where φ and θ are the azimuth and elevation of the look direction, respectively.

It should be noted that a far field model for the noises was used to obtain the above equations. It is not necessarily desirable to use a far field model for the target (desired signal). For example, one may want to implement a focusing effect on the target in near field situations. Such an effect can be obtained by manipulating the steering vector accordingly.

The fixed solution technique of FIG. 1, using equation (1), provides a way to calculate the gain weights of each sensor in an array for each frequency. More specifically, for each frequency of interest the system of FIG. 1, equation (1) is solved to yield one weight for each filter ($w_{opt}$ is a vector with the number of elements being equal to the number of sensors). Thus, if it is desired to obtain the optimum weights for ten frequencies, for example, equation (1) is solved for ten frequencies and each filter $\mathbf{16}_{1-N}$ is then defined by ten frequency domain weights—the set of frequency domain weights for each filter defining the filter's frequency domain response.

Once the frequency response for each filter is determined, it is necessary to design the time domain filters to provide the determined frequency response. If the weights (or "gains") are real numbers—meaning that the desired filter has a linear phase—we can use the weights with any of the well-known methods to design the filter for each sensor. For example, a Remez Exchange Method can be used. For simple cases such as when the array is linear and the noise sources are positioned in a symmetric structure around the look direction, the gain weights would be real numbers. If the gain weights are complex numbers, such as when the noise structure is not symmetric, the required filter will not have a linear phase. For these cases one can feed the weights for each filter to an IFFT (Inverse Fast Fourier Transform) procedure to obtain the time domain function that would provide the desired frequency response and phases for the filter.

2—A Method for Designing and Implementing Fixed Beam Optimal Filters Based on the Filtered References Approach.

Figure 2:
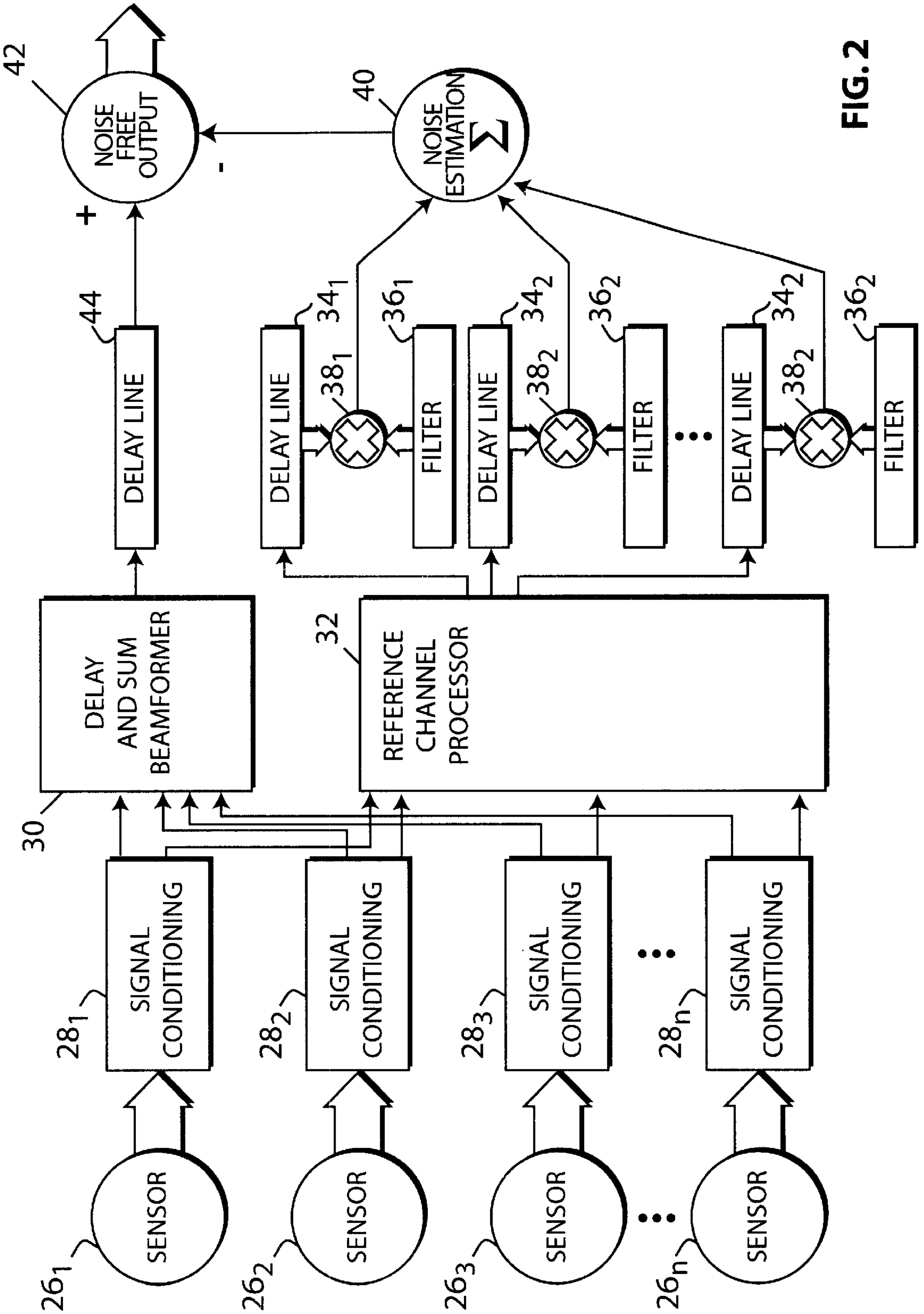
FIG. 2 is a block diagram of a filtered references type beamforming system in accordance the present invention.

FIG. 2 is a block diagram of a filtered references type beamforming system in accordance the present invention.

As can be seen from FIG. 2, N microphones $26_{1-N}$ are conditioned and sampled by signal conditioners $28_{1-N}$. The microphone outputs are processed by a delay and sum beamformer 30 to provide a beam channel, and by a reference channel processor 32 which is typical of an LMS beamforming system. As shown, the beam channel may be formed via the classic delay and sum beamforming process on the inputs, however the alternatives include any linear combination of sensor outputs that will provide a maximum towards the looking (listening) direction. The reference channels are processed such that a null is placed towards the looking direction. It may be obtained by subtracting one microphone form the other, or by forming some other linear combination of sensor outputs. The output of the reference channels is respectively stored in tapped delay lines $34_{1-L}$ (L may or may not be equal to N) and filtered by filters $36_{1-L}$ via convolvers $38_{1-N}$ The filtered reference channel output is summed via an adder 40 and subtracted via a subtractor 42 from the beamformer output as delayed by a delay line 44. This structure is typical to adaptive beamformers, where the reference channels are filtered by adaptive filters and then summed and subtracted from the delayed main beam signal. In our case, the filters are fixed (non adaptive) and predesigned. The method is highly practical in systems that already have the structure of an adaptive beamformer, which can be applied to both the adaptive solution and the fixed solution.

In the filtered references embodiment of FIG. 2, the filters' coefficients are designed and determined using equation (5). More particularly, the noise covariance matrix is determined and then used in equation (5) to determine the filter coefficients. As was the case in the filtered input embodiment of FIG. 1, equation (5) provides filter coefficients in the frequency domain and it is necessary to obtain the time domain coefficients from the frequency domain coefficients.

Equation (5) is expressed as $$w_{opt}=C^{-1}p \text{ where}$$

C is the noise covariance matrix as measured by the reference channels, and p is the correlation vector between the main channel (beam) output and the reference channels. We obtain the noise covariance matrix using techniques that are similar to those used in the filtered inputs approach. The difference is that we need to obtain the noise received as it appears in the reference channels, and not as it appears at each sensor. To do this, we first obtain the contribution of each noise source to each sensor (the same $y_i$ that we obtained in the previous method), and then find the contribution of each noise source to each reference channels. The reference channels are generally relatively flat sensitivity patterns having nulls pointing to the array look direction. The reference channels are created using linear combinations of the elements' outputs after they have been steered to the look direction. For example $x_1+x_2-(x_3+x_4)$ may be a reference channel after the inputs (denoted as $x_n$) have been appropriately delayed to compensate for the look direction. These relations can be expressed as a nulling matrix N (note again that in order to guarantee a signal free reference the sum of the elements of each row in the matrix should be 0).

Example for nulling matrix for an array of four microphones and three reference channels is $$N=\frac{1}{4}\begin{bmatrix} 1 & 1 & -1 & -1 \\ -3 & 1 & 1 & 1 \\ 1 & 1 & 1 & -3 \end{bmatrix} \quad (14)$$

Note also that for an n elements array only n−1 independent nulls can be created. If we denote v as the steering vector to the look direction than we can obtain the contribution of the a noise source i to the reference channels through the following equation:

$$x_i=N\cdot\text{diag}(v)\cdot y_i \quad (15)$$

where diag(v) is the diagonal matrix which elements are the element of the vector v (for broad side array diag(v)=I—the unity matrix), $y_i$ is the interference contribution of noise source i measured by the array elements as described above, N is the a Nulling matrix used to create the reference channels and $x_i$ is the contribution of interference of noise source i as measured by the reference channels. Through equation (15) the contribution of a noise source is "transferred" from the array elements to the reference channels.

The overall noise measured the reference channels is the sum of the noise contributed by each interference.

$$x=\Sigma x_i \quad (16)$$

where x is the noise measured at the reference channels. The contribution of each $x_i$ to the noise covariance matrix is expressed as $$C_i=E\{x_ix_i^1\} \quad (17)$$

As in the case of equation (11), since x is a multiplication of a stationery signal by a deterministic one (the steering elements) the equation is reduced to $$C_i=x_ix_i^1 \quad (17a)$$

Under the assumption that the interferences are uncorrelated we can write $$C=\Sigma C_i \quad (18)$$

If we assume that there is an additive uncorrelated noise n (spatially distributed white noise) to each of the sensors we obtain $$C=nI+\Sigma C_i \quad (19) \text{ where}$$

I is the unity matrix with a size of [M×M].

We now need to find the correlation vector p. This vector expresses the correlation between the beam signal and the reference channels. The correlation vector p is given by:

$$p=\Sigma p_i \quad (20)$$

where $p_i$ is given by $$p_i=\text{beam}_ix_i \quad (21)$$

and $$\text{beam}_i=v^ty_i \quad (22)$$

After obtaining both C and p equation (5) is used to find the gain weights for each frequency. The practicality of obtaining the weight for a series of discrete frequencies and the actual design of the filters was demonstrated above in relation to the filtered inputs method of FIG. 1.

Figure 2A:
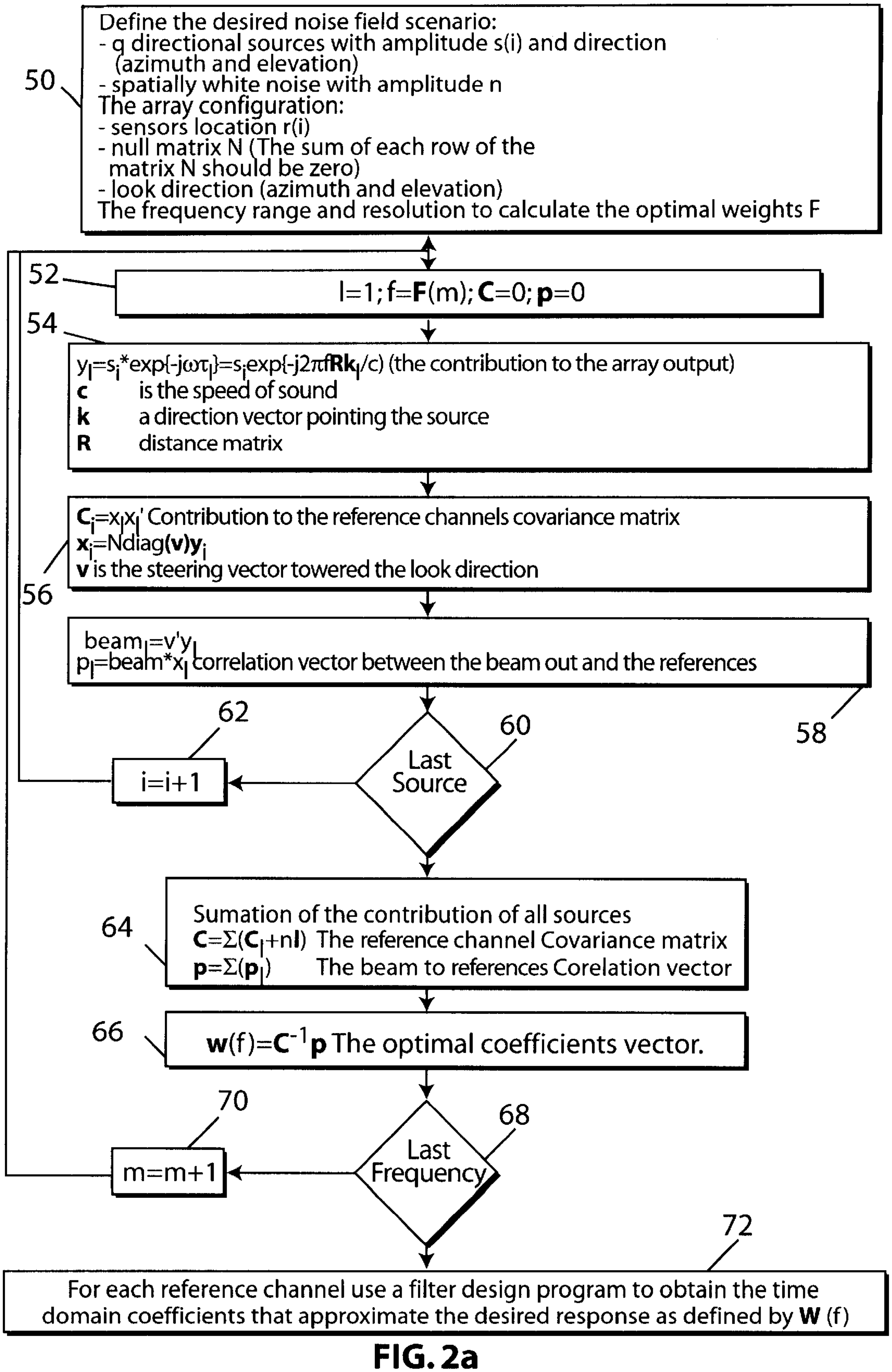
FIG. 2A is a flowchart which shows an illustrative procedure for designing and implementing the fixed filtered references approach.

An illustrative procedure for designing and implementing the fixed filtered references approach is shown in FIG. 2A. As can be seen from the figure, the first steps are to define the desired noise scenario, the array configuration and frequency range and resolution (step 50), and to initialize certain variables to be used in the procedure(step 52). Next, the contribution of a first noise source to the noise covariance matrix—at the array output—is computed (step 54). The noise source's contribution to reference channel noise covariance matrix is then computed on the basis of the source's contribution at the array output, the nulling matrix and the steering vector toward the array look direction (step 56) is computed, and the correlation vector between the beam signal and the reference channels for the source is determined (step 58).

At this point a determination is made as to whether each source has been considered in steps 52–58 (step 60). If not all noise sources have been considered, a count variable is incremented (step 62) and steps 52–58 are performed for the next noise source. If all noise sources have been considered, the contributions of each noise source to each reference channel are summed to generate a reference channel covariance matrix and the beam/reference channels correlation vectors are added to determine a beam/reference channel correlation matrix (step 64). Once the reference channel noise covariance matrix and correlation matrix are determined for a particular frequency under consideration, a filter coefficient corresponding to that frequency is determined for each channel according to equation (5) (step 66).

A determination is then made if each desired frequency has been considered (step 68) If not all frequencies have been considered, a count variable is incremented (step 70) and steps 52–68 are performed for the next frequency. If all frequencies have been considered, a filter design program is used to obtain the filter time domain coefficients that approximate the desired response as defined by the frequency domain coefficients determined in step 66 (step 72).

3—A Hybrid System That Includes Both a Fixed Solution and an Adaptive one

Adaptive systems are designed to provide the optimum solution to the noise environment at any time. Using the reference channel type approach, an adaptive system measures and studies the noise sources through the reference channels and subtracts it utilizing LMS filters. A major problem of an adaptive system is the leakage problem. The desired signal "leaks" into the reference channel nulls due to differences in the sensors' sensitivity and phases, or due to mechanical imperfections. The leakage of the desired signal into the nulls causes the system to try and cancel the desired signal as though it was noise, and thereby causes distortion in reception of the desired signal. One way to prevent signal distortion due to leakage is by blocking (or freezing) the adaptive process when a strong desired signal is detected, and thus prevent the adaptive process from attempting to cancel the desired signal. However, regardless of the logic of the adaptive process blockage, blocking has the effect of locking the noise reduction filters on the solution existing immediately before blockage commenced, resulting in the filters losing their relevancy in time.

In order to overcome the ameliorate the problems associated with leakage and blocking, the present invention provides a system in which the filters' coefficients drift form their adaptive solution into a pre-designed fixed solution. The system initializes its filters' coefficients with the fixed pre-designed solution and fades into the fixed solution whenever the adaptive process is blocked. The drifting mechanism is implemented in the following way: let $w_i(n)$ be the i-th coefficient of an adaptive filter at time n, and let w(0) be the fixed value of that filter coefficient, then $$w_i(n+1)=w_i(n)*\gamma+w_i(0)*(1-\gamma) \qquad (23)$$

where $\gamma$ determines how fast the filter will converge into its fixed solution.

The drifting process of the invention serves another purpose. It has been shown that the adaptive process may explode (or diverge) due to numerical problems when the process is performed by a fixed-point processor (see Limited-Precision Effects in Adaptive Filtering—John M. Cioffi—IEEE Transactions on Circuits and Systems vol cas-34 no. 7, July 1987). To prevent such a divergent breakdown, it is sometimes useful to apply a "leaky filter". A leaky filter multiplies its coefficients by a number smaller than one before they get updated, thus preventing divergence due to numerical problems. Although the leaky process does not allow the filter to converge to the optimum solution, it prevents mathematical divergence.

The use of the decaying process proposed here will eliminate the need to use a strong leaky process (or any leaky process) since whenever the adaptive process is blocked the whole adaptive process is actually reset. Also it is possible to be more generous in the blocking logic—meaning it is possible to allow it to happen more often, since the filter will fade into a sub optimal, but fairly good, solution and the pitfalls normally associated with blocking are avoided.

4—Alternative Approaches to Design and Implement Fixed Beam Filters

In parts one and two of this description fixed beamformer implementations of the invention were presented. In these two implementations one simulates a noise structure by placing noise sources in the sphere, then the noise covariance matrix is calculated and the optimum filter for that noise structure is obtained. In part three of the description a hybrid beamformer implementation was discussed. In the third implementation, an adaptive process is employed when there are significant noises to adapt to, and the fixed solution kicks in when the adaptive process in inhibited for some reason (e.g. a strong signal).

It is proposed here that, assuming one has the infrastructure for an adaptive solution, it can be utilized to obtain the fixed solution using the adaptive process. For example, lets assume that the adaptive process is implemented on an off line system using high-level language (like Matlab for example). One can simulate the noise structure off-line, i.e. obtain the noise signal on each of the microphones (time domain noise sources multiplied by the source steering vector). This noise data can then be fed into the simulated off-line adaptive process. Once the adaptive process converges, one can read the final values of the filters' coefficients and use them as the optimum solution for the pre-defined noise situation. The disadvantage of using the adaptive process in a simulated environment to obtain the fixed weights is that it is time consuming. Large data files need to be prepared for the filters to converge and the adaptive process is a very computation intensive when it is done off-line. Also, the existence of an adaptive system simulation has been assumed, and if one does not exist it needs to be prepared. The advantage of this method is that it would provide a more accurate solution than the direct methods. The reason is that the direct methods determine the gain weight in the frequency domain. It is then necessary to go through a filter design process that is, by nature, an approximation and includes inherent compromises, over which we have no control. Even more so, in the methods discussed in parts one and two each filter is designed separately and we have no guaranty that the overall beamformer performance (using all the filters concurrently) could not provide a better solution.

Running the simulated data through the adaptive process assure us that we get the optimum solution for the simulated scenario, that is for the simulated noise environment and array structure. For example, if we use the reference channel type adaptive filter, the solution will take into account the specific way we actually implemented the reference channels—which the separate filter design discussed in part two does not take into account.

Another approach proposed in this invention assumes that there is a real time working adaptive system. The simulated noise data can be stored on a recording media, such as a multi-channel digital tape recorder, or a computer equipped with a multi-channel sound card. The noise data can be injected into the real time working system which will converge to the solution, freeze the final filters' coefficients and either store them permanently as the fixed solution or transmit them to a hosting system to be burned into the fixed beamformer solution. The advantage of this method is that once the noise data is prepared, the solution is obtained very fast. The adaptive filter will converge within seconds. Another advantage of this method is that the fixed solution will take into account all kinds of implementation related issues like—fixed point and numerical inaccuracies, final dynamic range of the system, differences in the input ports of the processor like different A/D converters and so on.

Taking the above approach one step further, the present invention proposes to create a simulated noise environment using loudspeakers in an an-echoic chamber, then running the adaptive system in the chamber and freezing the final values of coefficients as the fixed array solution. Loudspeakers are placed in an an-echoic chamber to simulate a certain noise scenario—for example two loudspeakers can be placed on each side of the array at 40 degrees and 75 degrees azimuth angle. A simulated noise is played through the loudspeakers—for example pink wide band noise. The adaptive system runs and converges (within seconds) and the final filters' coefficients are stored. The process can be automated—the adaptive system is put in a calibration mode, the adaptive system converges and than stores coefficients converged to as in its own memory as the fixed solution. The calibrated system is than switched off from the calibration mode for normal operation.

The advantage of using the actual working adaptive system is that the convergence solution takes into account not just the process itself with all its peculiarities like dynamic range of the processor and the exact implementation of the filters, but also unknown factors like the microphones sensitivities and phases, mechanical interferences and so on. This is particularly important since it has been observed that the fixed solution is very sensitive to some parameters like mismatch in phases. Also, if the sensors are microphones, for example, and cardioids (uni directional) microphones are used instead of omni directional microphones, then the mismatch in phase may be such that the actual performance of the filters may be far from what was pre-designed. The packaging of the microphone (or other sensor) array may also affect the performance strongly. Using the real working adaptive system to adaptively generate the fixed solution coefficients takes all these parameters into account and ensures an optimum solution the given system.

The disadvantage of the method is that, in general, it is necessary to use many simulated noise sources in order to achieve desirable performance improvement. Use of one noise source located at one side of an array, for example, may cause the array to adapt such that the noise source is effectively cancelled while the beam shape on the array side opposite is undesirable. However, for a relatively small array, where the fixed super directionality is most needed, few noise sources will usually be sufficient to provide an improved performance. For instance, in a four cardioids microphone array with an aperture of 6" four noise sources are sufficient to provide a noise rejection of 20 dB at angles over 30 degrees from the look direction.

Figure 3:
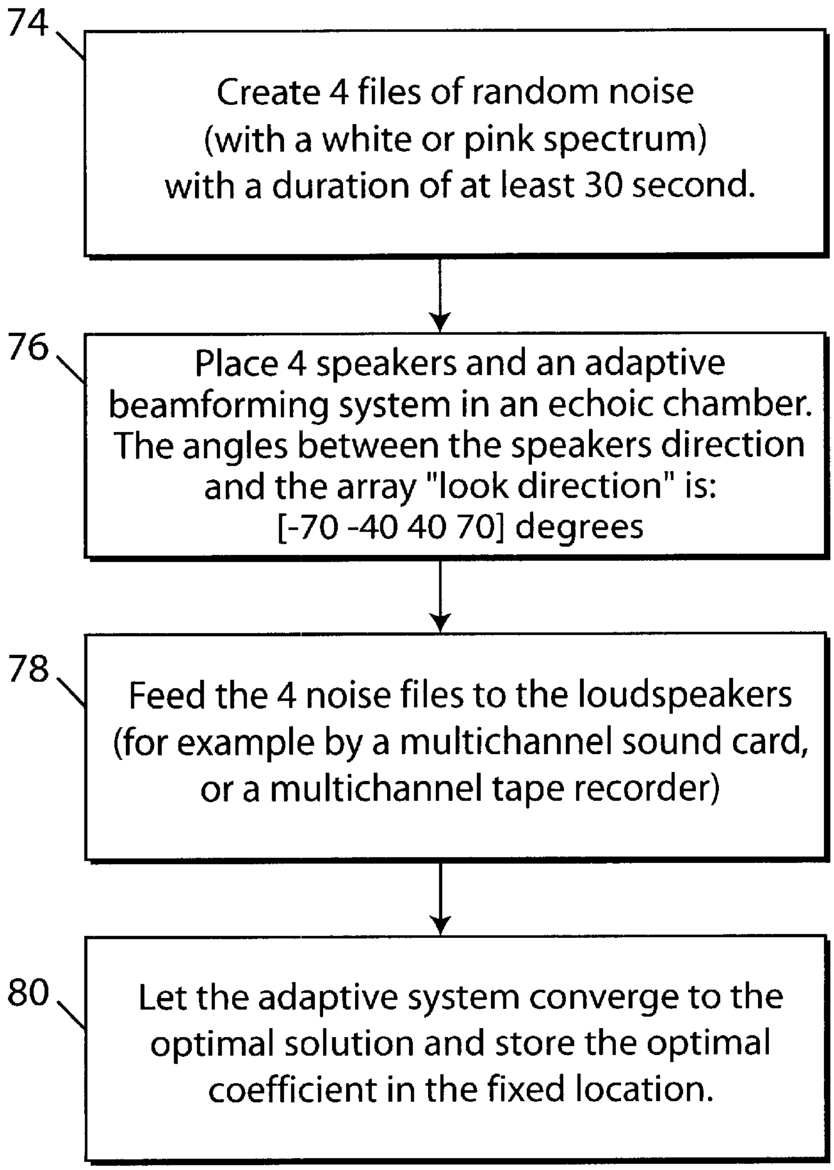
FIG. 3 is a flowchart showing an illustrative procedure for generating fixed filter coefficients through the use of simulated noise and an actual adaptive system positioned in an an-echoic chamber.

An illustrative procedure for generating fixed filter coefficients through the use of simulated noise and an actual adaptive system positioned in an an-echoic chamber is shown FIG. 3. The first step is to create four random noise files having a white or pink spectrum and a duration of 30 seconds or more (step 74). Next, four speakers and an adaptive beamforming system are place in an an-echoic chamber, with the angles between the speakers and array look direction being set at −70°, −40°, 40° and 70° (step 76). The four noise files are fed to the loudspeakers (step 78) and the adaptive system is allowed to converge to the optimal solution and the filter coefficients corresponding to the optimal solution are stored (step 80).

Another technique to calibrate a system is proposed here. The microphone array is placed in the an-echoic chamber and the simulated noise is played through the loudspeakers. The output of the array is recorded (no real time DSP system is present in the chamber). The recorded output is then replayed into the real time system. The adaptive process converges and the final filters' coefficients are stored and burned into the system as the fixed array solution. This method is sometimes more practical when the automatic calibration and burning mechanism is not implemented. It is highly inconvenient to perform the down loading and uploading of the coefficient from a system that is positioned in the chamber. This operation usually requires a development system (like In Circuit Emulator or a simulator). It is much more convenient to do the recording in the chamber and perform the down loading and uploading of coefficients outside were the development system is located.

Figure 4:
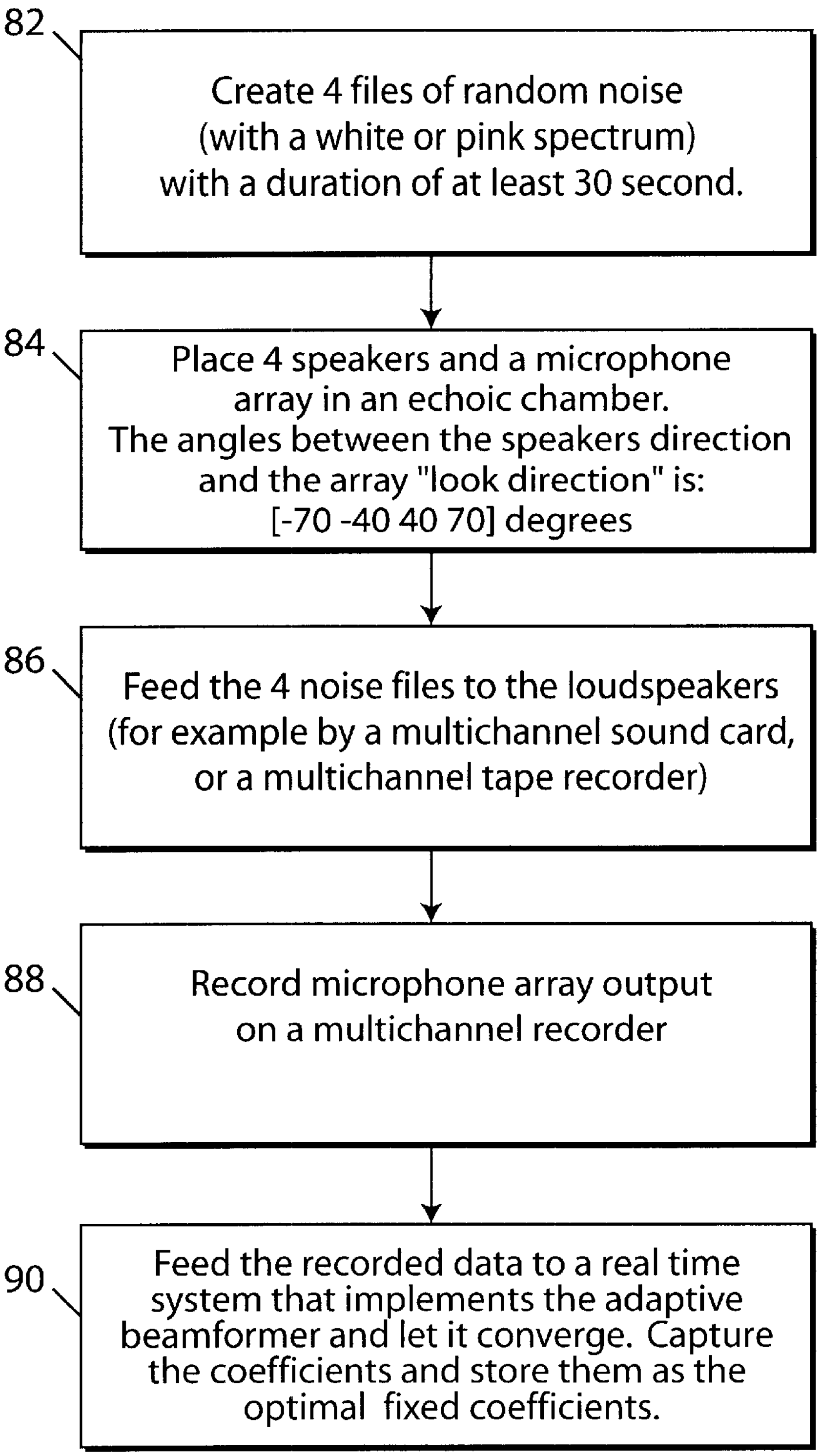
FIG. 4 is a flowchart showing an illustrative procedure for generating fixed filter coefficients through the use of simulated noise, a microphone array positioned in an an-echoic chamber and an actual adaptive system positioned outside an an-echoic chamber.

An illustrative procedure for generating fixed filter coefficients through the use of simulated noise, a microphone array positioned in an an-echoic chamber and an actual adaptive system positioned outside an an-echoic chamber is shown in FIG. 4. As in the procedure of FIG. 3, the first step in the FIG. 4 procedure is to create four random noise files having a white or pink spectrum and a duration of 30 (step 82). The next is to place four speakers and an a microphone array in an an-echoic chamber, with the angles between the speakers and array look direction being set at −70°, −40°, 40° and 70° (step 84). The four noise files are fed to the loudspeakers (step 86) and the microphone array's output is recorded on a multi-channel recorder (step 88). The recorded output is then played into an adaptive beamformer system which is located outside the an-echoic chamber and the beamformer is allowed to converge to the optimal solution, the coefficients corresponding to the optimal solution being stored for use as the fixed filter coefficients (step 90).

Figure 5:
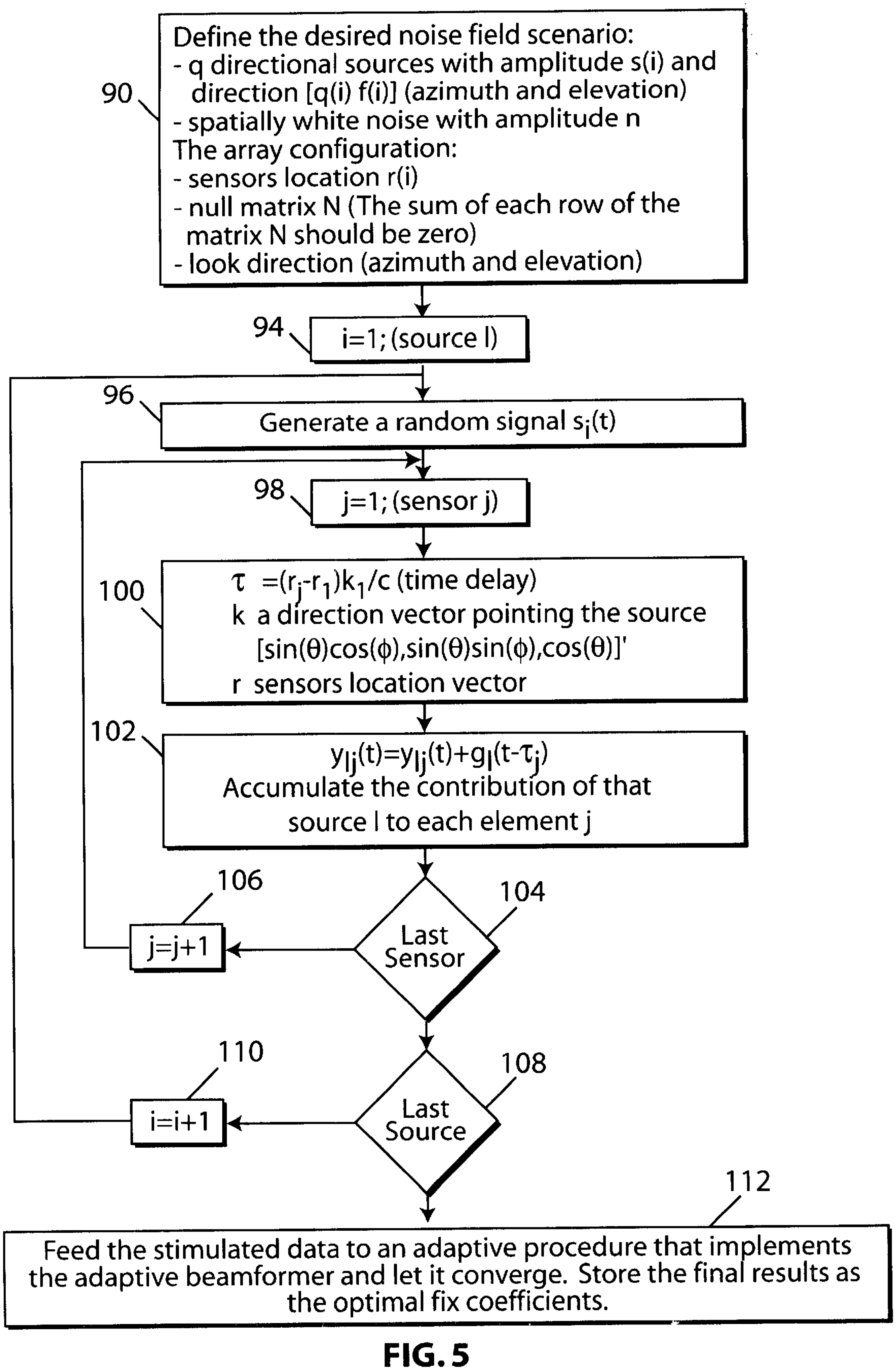
FIG. 5 is a flowchart showing an illustrative procedure for generating simulated noise and using the simulated noise to generate fixed beamformer coefficients.

FIG. 5 shows an illustrative procedure for generating simulated noise and using the simulated noise to generate fixed beamformer coefficients. The first step in the procedure is to define the desired noise field scenario and the array configuration (step 90). Next, a counting variable indicative of the noise source being considered is initialized to one (step 94). A random signal is generated to represent the noise emanating from the source under consideration (step 96), and for each sensor, the contribution of noise from the source under consideration is calculated. Calculation of noise source contributions involves; initializing to one a counting variable indicative of the sensor under consideration (step 98); determining the time delay from the source to the sensor under consideration, relative to the time delay to other sensors (step 100); and determining the noise source contribution based on the random signal generated in step 96 and the time delay (step 102).

After the noise contribution of a source to a particular sensor is calculated, a determination is made as to whether all sensors have been considered (step 104). If all sensors have not been considered, the sensor counting variable is incremented (step 106) and the procedure returns to step 98. When all sensors have been considered for a particular source, a determination is made as to whether all sources have been considered (step 108), and if not, the source counting variable is incremented (step 110) and the procedure returns to step 96. Once the contribution of each noise source to each sensor has been calculated the generation of the simulated noise data is complete. The noise data is then fed to an adaptive procedure which is allowed to converge, and the coefficients derived from the converged operation are stored for use as the optimal fixed coefficients (step 112).

While the present invention has been particularly shown and described in conjunction with preferred embodiments thereof, it will be readily appreciated by those of ordinary skill in the art that various changes may be made without departing from the spirit and scope of the invention. Therefore, it is intended that the appended claims be interpreted as including the embodiments described herein as well as all equivalents thereto.

What is claimed is:

1. A sensor array for receiving a signal that includes a desired signal and noise, comprising:

a plurality of sensors;

a plurality of filters for filtering the output of each sensor, each filter being defined by one or more filter coefficients; and a means for combining the outputs of said filters to form a sensor array output signal;

wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt} = \frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n"coefficients for each filter.

2. The sensor array as set forth in claim 1, wherein said sensors are microphones.

3. The sensor array as set forth in claim 1, wherein said filter coefficients are frequency domain coefficients such that for each said filter said frequency domain coefficients determine the frequency response of said filter.

4. The sensor array as set forth in claim 1, wherein said filter coefficients are time domain coefficients.

5. The sensor array as set forth in claim 4, further comprising:

a plurality of delay lines, said delay lines corresponding to respective outputs of said sensors and receiving respective outputs from said sensors; and a plurality of convolvers, corresponding to respective outputs of said delay lines, said convolvers being operative to receive respective outputs from said delay lines and convolve the received outputs with respective filter coefficients to generate a plurality of filtered delay line outputs;

wherein said plurality of filtered delay line outputs are combined by said means for combining to form said array output.

6. The sensor array as set forth in claim 5, further comprising a plurality of signal conditioners for receiving respective outputs from said sensors, sampling the received outputs and passing the sampled received outputs to respective delay lines.

7. The sensor array as set forth in claim 1, wherein said fixed filter coefficients are determined by placing the array in a simulated noise environment, letting the adaptation of the filter weights converge to a solution and then setting the fixed filter coefficients equal to the coefficients of the converged adaptive solution.

8. The sensor array as set forth in claim 1, wherein said fixed filter coefficients are determined by simulating a noise environment and the array's response to said noise environment, letting the simulated adaptation of the filter weights converge to a solution and then storing the coefficients of the converged adaptive solution for use as the fixed weights of an actual array.

9. A sensor array for receiving a signal that includes a desired signal and noise, comprising:

a plurality of sensors;

a plurality of filters for filtering the output of each sensor, each filter being defined by one or more filter coefficients; and a means for combining the outputs of said filters to form a sensor array output signal;

wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt} = \frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n" coefficients for each filter; and wherein said fixed filter coefficients are determined by simulating a noise environment, recording the simulated noise generated in said environment, playing back said simulated noise for reception by the array, letting the adaptation of the filter weights converge to a solution and then setting the fixed filter coefficients of the array equal to the coefficients of the converged adaptive solution.

10. An sensor array for receiving signal that includes a desired signal and noise, comprising:

a plurality of sensors;

a delay and sum beamformer for combining the outputs of said sensors to generate a beamformer output;

a reference channel processor for combining the outputs of said sensors to generate one or more reference channel signals;

at least one filter for each said reference channel, each said filter being defined by one or more coefficients; and means for combining the outputs of said filters with said beamformer output to generate a sensor array output signal;

wherein said reference channel processor and said filters operate to maximize the signal to noise ratio of the array output signal, wherein said filter coefficients are adaptively determined so as to maximize the signal to noise ratio of the array output signal, and wherein upon the occurrence of a predetermined event the adaptive determination of said filter coefficients is stopped and said filter coefficients faded into a predetermined set of fixed coefficients; the fixed filter coefficients being determined by solving directly and non-adaptively an equation $$w_{opt}=C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter.

11. The sensor array as set forth in claim 10, wherein said sensors are microphones.

12. The sensor array as set forth in claim 10, wherein said filter coefficients are frequency domain coefficients such that for each said filter said frequency domain coefficients determine the frequency response of said filter.

13. The sensor array as set forth in claim 10, wherein said filter coefficients are time domain coefficients.

14. The sensor array as set forth in claim 13, further comprising:

a main channel delay line for delaying the output of said beamformer;

a plurality of reference channel delay lines, said reference channel delay lines corresponding to respective reference channel signals and receiving respective reference channel signals; and a plurality of convolvers, corresponding to respective outputs of said reference channel delay lines, said convolvers being operative to receive respective outputs from said reference channel delay lines and convolve the received outputs with respective filter coefficients to generate a plurality of filtered delay line outputs;

wherein said plurality of filtered delay line outputs and said main channel delay line output are combined by said means for combining to form said array output.

15. The sensor array as set forth in claim 14, further comprising a plurality of signal conditioners for receiving respective outputs from said sensors, sampling the received outputs and passing the sampled received outputs to said delay and sum beamformer and said reference channel processor.

16. The sensor array as set forth in claim 10, wherein said fixed filter coefficients are determined by placing the array in a simulated noise environment, letting the adaptation of the filter weights converge to a solution and then setting the fixed filter coefficients equal to the coefficients of the converged adaptive.

17. The sensor array as set forth in claim 10, wherein said fixed filter coefficients are determined by simulating a noise environment and the array's response to said noise environment, letting the simulated adaptation of the filter weights converge to a solution and then storing the coefficients of the converged adaptive solution for use as the fixed weights of an actual array.

18. An sensor array for receiving signal that includes a desired signal and noise, comprising:

a plurality of sensors;

a delay and sum beamformer for combining the outputs of said sensors to generate a beamformer output;

a reference channel processor for combining the outputs of said sensors to generate one or more reference channel signals;

at least one filter for each said reference channel, each said filter being defined by one or more coefficients; and means for combining the outputs of said filters with said beamformer output to generate a sensor array output signal;

wherein said reference channel processor and said filters operate to maximize the signal to noise ratio of the array output signal, wherein said filter coefficients are adaptively determined so as to maximize the signal to noise ratio of the array output signal, and wherein upon the occurrence of a predetermined event the adaptive determination of said filter coefficients is stopped and said filter coefficients faded into a predetermined set of fixed coefficients; the fixed filter coefficients being determined by solving directly and non-adaptively an equation $$w_{opt}=C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter; and wherein said fixed filter coefficients are determined by simulating a noise environment, recording the simulated noise generated in said environment, playing back said simulated noise for reception by the array, letting the adaptation of the filter weights converge to a solution and then setting the fixed filter coefficients of the array equal to the coefficients of the converged adaptive solution.

19. A method of processing a received signal that includes a desired signal and noise, comprising the steps of:

providing an array of sensors;

filtering the output of each sensor through a filter, each filter being defined by one or more filter coefficients; and combining the outputs of said filters to form a sensor array output signal;

wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt} = \frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n" coefficients for each filter.

20. The method according to claim 19, wherein said sensors are microphones.

21. The method according to claim 19, wherein said filter coefficients are frequency domain coefficients such that for each said filter said frequency domain coefficients determine the frequency response of said filter.

22. The method according to claim 19, wherein said filter coefficients are time domain coefficients.

23. The method according to claim 22, further comprising the steps of:

receiving the outputs of said sensors at a plurality of respective delay lines;

receiving the outputs of said delay lines at respective convolvers;

convolving the received delay line outputs with respective filter coefficients to generate a plurality of filtered delay line outputs; and combining said plurality of filtered delay line outputs to generate said array output.

24. The sensor array as set forth in claim 23, further comprising the steps of:

receiving the outputs of said sensors at respective signal conditioners; and sampling the received outputs and passing the sampled received outputs to respective delay lines.

25. The sensor array as set forth in claim 19, wherein said fixed filter coefficients are determined by placing the array in a simulated noise environment, letting the adaptation of the filter weights converge to a solution and then setting the fixed filter coefficients equal to the coefficients of the converged adaptive solution.

26. The sensor array as set forth in claim 19, wherein said fixed filter coefficients are determined by simulating a noise environment and the array's response to said noise environment, letting the simulated adaptation of the filter weights converge to a solution and then storing the coefficients of the converged adaptive solution for use as the fixed weights of an actual array.

27. A method of processing a received signal that includes a desired signal and noise, comprising the steps of:

providing an array of sensors;

filtering the output of each sensor through a filter, each filter being defined by one or more filter coefficients; and combining the outputs of said filters to form a sensor array output signal;

wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt} = \frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n" coefficients for each filter; and wherein said fixed filter coefficients are determined by simulating a noise environment, recording the simulated noise generated in said environment, playing back said simulated noise for reception by the array, letting the adaptation of the filter weights converge to a solution and then setting the fixed filter coefficients of the array equal to the coefficients of the converged adaptive solution.

28. A method for receiving a signal that includes a desired signal and noise, comprising the steps of:

providing an array of sensors;

generating a beamformer output by passing the outputs of said sensors through a delay and sum beamformer;

generating one or more reference channel signals by passing the outputs of said sensors through a reference channel processor;

filtering each reference channel using at least one filter, each said filter being defined by one or more coefficients; and combining the outputs of said filters with said beamformer output to generate a sensor array output signal;

wherein said reference channel processor and said filters operate to maximize the signal to noise ration of the array output signal, wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt} = C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter.

29. The method according to claim 28, wherein said sensors are microphones.

30. The method according to claim 28, wherein said filter coefficients are frequency domain coefficients such that for each said filter said frequency domain coefficients determine the frequency response of said filter.

31. The method according to claim 28, wherein said filter coefficients are time domain coefficients.

32. The method according to claim 31, further comprising the steps of:

delaying the output of said beamformer via a main channel delay line;

delaying said reference channel signals via respective reference channel delay lines;

convolving the outputs of said reference channel delay lines with respective filter coefficients to generate a plurality of filtered delay line outputs; and combining said filtered delay line outputs and said main channel delay line output to generate said array output.

33. The method according to claim 32, further comprising the steps of:

receiving the outputs of said sensors at respective signal conditioners; and sampling the received outputs and passing the sampled received outputs to said delay and sum beamformer and said reference channel processor.

34. The method according to claim 28, wherein said fixed filter coefficients are determined by placing the array in a simulated noise environment, letting the adaptation of the filter weights converge to a solution and then setting the fixed filter coefficients equal to the coefficients of the converged adaptive.

35. The method according to claim 28, wherein said fixed filter coefficients are determined by simulating a noise environment and the array's response to said noise environment, letting the simulated adaptation of the filter weights converge to a solution and then storing the coefficients of the converged adaptive solution for use as the fixed weights of an actual array.

36. A method for receiving a signal that includes a desired signal and noise, comprising the steps of:

providing an array of sensors;

generating a beamformer output by passing the outputs of said sensors through a delay and sum beamformer;

generating one or more reference channel signals by passing the outputs of said sensors through a reference channel processor;

filtering each reference channel using at least one filter, each said filter being defined by one or more coefficients; and combining the outputs of said filters with said beamformer output to generate a sensor array output signal;

wherein said reference channel processor and said filters operate to maximize the signal to noise ration of the array output signal, wherein said filter coefficients are adaptively determined so as to maximize the signal to noise ratio of the array output signal, and wherein upon the occurrence of a predetermined event the adaptive determination of said filter coefficients is stopped and said filter coefficients are faded into a predetermined set of fixed coefficients; the fixed filter coefficients being determined by solving directly and non-adaptively an equation $$w_{opt}=C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter; and wherein said fixed filter coefficients are determined by simulating a noise environment, recording the simulated noise generated in said environment, playing back said simulated noise for reception by the array, letting the adaptation of the filter weights converge to a solution and then setting the fixed filter coefficients of the array equal to the coefficients of the converged adaptive solution.

37. A sensor array for receiving a signal that includes a desired signal and noise, comprising:

a plurality of sensors;

a plurality of filters for filtering the output of each sensor, each filter being defined by one or more filter coefficients; and a means for combining the outputs of said filters to form a sensor array output signal;

wherein said filter coefficients are determined by solving an equation $$w_{opt}=\frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n" coefficients for each filter; and wherein said noise covariance matrix is determined by defining a spatial distribution of noise sources; defining a delay vector for each noise source using said spatial distribution, said delay vector expressing the relative times of arrival of the wavefront from said noise source at each sensor; defining a steering vector for each said noise source based on said delay vector; using said steering vector to determine the contribution of each noise source to said noise covariance matrix; and generating said noise covariance matrix by adding the contributions of each noise source and a matrix indicative of spatially distributed white noise.

38. The sensor array as set forth in claim 37, wherein said equation is solved for "n" frequencies to yield "n" coefficients for each filter, and for each filter, said "n"coefficients are used to generate filter design values according to an operation selected from the group consisting of a Remez Exchange operation and an Inverse Fourier Transform operation.

39. An sensor array for receiving signal that includes a desired signal and noise, comprising:

a plurality of sensors;

a delay and sum beamformer for combining the outputs of said sensors to generate a beamformer output;

a reference channel processor for combining the outputs of said sensors to generate one or more reference channel signals;

at least one filter for each said reference channel, each said filter being defined by one or more coefficients; and means for combining the outputs of said filters with said beamformer output to generate a sensor array output signal;

wherein said filter coefficients are determined by solving an equation $$w_{opt}=C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter; and wherein said noise covariance matrix is determined by defining a spatial distribution of noise sources; defining a delay vector for each noise source using said spatial distribution, said delay vector expressing the relative times of arrival of the wavefront from said noise source at each sensor; defining a steering vector for each said noise source based on said delay vector; using said steering vector to determine the contribution of each noise source to said noise covariance matrix as measured at the sensors; defining a nulling matrix which indicates how said filter outputs are combined to generate said reference channels; determining an array steering vector towards the array look direction; determining the contribution of each noise source to each reference channel based on said contribution of each noise source at said sensors, said nulling matrix and said array steering vector; and generating said noise covariance matrix by adding the contributions of each noise source to said reference channels and a matrix indicative of spatially distributed white noise.

40. The sensor array as set forth in claim 39, wherein said equation is solved for "n" frequencies to yield "n" coefficients for each filter, and for each filter, said "n" coefficients are used to generate filter design values according to an operation selected from the group consisting of a Remez Exchange operation and an Inverse Fourier Transform operation.

41. A method of processing a received signal that includes a desired signal and noise, comprising the steps of:

providing an array of sensors;

filtering the output of each sensor through a filter, each filter being defined by one or more filter coefficients; and combining the outputs of said filters to form a sensor array output signal;

wherein said filter coefficients are determined by solving an equation $$w_{opt} = \frac{C^{-1}v}{vC^{-1}v}$$

where C is the noise covariance matrix, v is the steering vector toward the array look direction, and $w_{opt}$ is a vector having a number of components equal to the number of sensors, and where solving said equation for "n" frequencies provides "n" coefficients for each filter; and wherein said noise covariance matrix is determined by defining a spatial distribution of noise sources; defining a delay vector for each noise source using said spatial distribution, said delay vector expressing the relative times of arrival of the wavefront from said noise source at each sensor; defining a steering vector for each said noise source based on said delay vector; using said steering vector to determine the contribution of each noise source to said noise covariance matrix; and generating said noise covariance matrix by adding the contributions of each noise source and a matrix indicative of spatially distributed white noise.

42. The method according to in claim 41, wherein said equation is solved for "n" frequencies to yield "n" coefficients for each filter, and for each filter, said "n" coefficients are used to generate filter design values according to an operation selected from the group consisting of a Remez Exchange operation and an Inverse Fourier Transform operation.

43. A method of processing a received signal that includes a desired signal and noise, comprising the steps of:

providing an array of sensors;

generating a beamformer output by passing the outputs of said sensors through a delay and sum beamformer;

generating one or more reference channel signals by passing the outputs of said sensors through a reference channel processor;

filtering each reference channel using at least one filter, each said filter being defined by one or more coefficients; and combining the outputs of said filters with said beamformer output to generate a sensor array output signal;

wherein said filter coefficients are determined by solving an equation $$w_{opt}=C^{-1}p$$

where C is the noise covariance matrix, p is a vector representing the correlation between the output of said beamformer and the output of said reference channels, and $w_{opt}$ is a vector having a number of components equal to the number of sensors, and where solving said equation for "n" frequencies provides "n" coefficients for each filter; and wherein said noise covariance matrix is determined by defining a spatial distribution of noise sources; defining a delay vector for each noise source using said spatial distribution, said delay vector expressing the relative times of arrival of the wavefront from said noise source at each sensor; defining a steering vector for each said noise source based on said delay vector; using said steering vector to determine the contribution of each noise source to said noise covariance matrix as measured at the sensors; defining a nulling matrix which indicates how said filter outputs are combined to generate said reference channels; determining an array steering vector towards the array look direction; determining the contribution of each noise source to each reference channel based on said contribution of each noise source at said sensors, said nulling matrix and said array steering vector; and generating said noise covariance matrix by adding the contributions of each noise source to said reference channels and a matrix indicative of spatially distributed white noise.

44. The method according to claim 43, wherein said equation is solved for "n" frequencies to yield "n" coefficients for each filter, and for each filter, said "n" coefficients are used to generate filter design values according to an operation selected from the group consisting of a Remez Exchange operation and an Inverse Fourier Transform operation.

* * * * *